United States Patent [19]

Schoenig, Jr. et al.

[11] Patent Number: 4,649,632
[45] Date of Patent: Mar. 17, 1987

[54] FUEL BUNDLE ASSEMBLY MACHINE

[75] Inventors: Fred C. Schoenig, Jr.; David R. McLemore; Richard G. Patterson, all of Wilmington, N.C.; George W. Tunnell, Foster City, Calif.

[73] Assignee: General Electric Company, San Jose, Calif.

[21] Appl. No.: 799,385

[22] Filed: Nov. 18, 1985

[51] Int. Cl.[4] .................. B23P 21/00; B23Q 15/00; B23Q 17/00; G21C 3/00
[52] U.S. Cl. .................. 29/701; 29/400 N; 29/714; 29/723; 29/726; 33/180 R; 209/518; 376/463; 414/146
[58] Field of Search .................. 29/701, 700, 703, 709, 29/714, 720, 723, 726, 727, 400 N; 33/180 R; 73/432 R; 376/245, 261, 463; 414/146, 745, 746; 209/518

[56] References Cited

U.S. PATENT DOCUMENTS

| | | | |
|---|---|---|---|
| 3,733,673 | 5/1973 | Young et al. | 29/727 X |
| 3,748,713 | 7/1973 | Tindale et al. | 29/723 X |
| 4,066,534 | 1/1978 | Arya | 209/518 |
| 4,235,066 | 11/1980 | King et al. | 29/723 X |
| 4,380,868 | 4/1983 | Hall | 29/726 |
| 4,382,329 | 5/1983 | Takaoka et al. | 29/726 |
| 4,543,711 | 10/1985 | Wada et al. | 29/726 |

Primary Examiner—Howard N. Goldberg
Assistant Examiner—Ronald S. Wallace
Attorney, Agent, or Firm—Fred Jacobs; Ivor J. James; Raymond G. Simkins

[57] ABSTRACT

An apparatus is provided for the automatic assembly of nuclear fuel rod bundles in a predetermined coordinate array. Each fuel rod is identified during its travel and positioned according to an identifying code carried on its lower end plug which designates the fuel enrichment and additive level of the rod.

12 Claims, 5 Drawing Figures

FUEL BUNDLE ASSEMBLY MACHINE

This invention relates generally to automatic assembly machines and more specifically to a machine adapted to automatically identify and position a plurality of nuclear fuel rods containing various fuel enrichment and additive levels in a parallel spaced array or bundle according to a desired coordinate bundle geometry.

BACKGROUND OF THE INVENTION

In a known type of nuclear reactor, the reactor core is of the heterogeneous type. That is, the core comprises a plurality of fuel assemblies or bundles, each vertically arranged in a spaced array to form the nuclear reactor core capable of self-sustained nuclear fission reaction. The core is contained in a pressure vessel wherein it is submersed in a working fluid, such as light water, which serves both as a coolant and as a neutron moderator. A plurality of control rods, containing neutron absorbing material, are selectively insertable among the fuel bundles to control the reactivity of the core. Such a reactor system is illustrated in greater detail, for example, in U.S. Pat. No. 3,382,153.

Each fuel bundle comprises a tubular flow channel containing an array of elongate, cladded fuel elements or rods supported between upper and lower tie plates. The fuel bundles are supported in the pressure vessel between an upper core grid and a lower core support plate. The lower tie plate of each fuel bundle is formed with a nose piece which fits through an aperture in the core support plate. The nose piece is formed with openings through which the pressurized coolant flows upward through the fuel bundle flow channels to remove heat from the fuel elements. A typical fuel bundle of this type is shown, for example, in U.S. Pat. No. 3,431,170.

Because of water gaps between fuel bundles, the distribution and position of the control rods, and other factors, the neutron flux and hence the power density is not uniform in a heterogeneous nuclear fuel core—not even within an individual fuel bundle. As a practical matter the power output of a nuclear reactor is limited by the fuel rod temperature limits at the peak power point in the core. To maximize the power output of the core (and of each fuel bundle) it is desirable to minimize the peak power-to-average power ratio, that is, it is desirable to "flatten" the power density variations. (This problem is discussed in greater detail, for example, in U.S. Pat. No. 3,147,191).

Several techniques have been proposed to accomplish power flattening within a fuel bundle. A well-known method is to appropriately vary the enrichment of the initial fuel in the fuel bundle. In practice this is accomplished by loading each fuel rod with fuel pellets of an enrichment appropriate to the position of the fuel rod in the fuel bundle.

The operation of known nuclear power reactors is based on the concept of an operating cycle. That is, reactor operation is periodically interrupted for refueling or reloading to restore the necessary reactivity. From the point of view of fueling or refueling the reactor core, the removable fuel bundle is the basic replaceable subdivision of the fuel core. According to known refueling schemes, only a fraction, for example 20–30 percent of the fuel bundles in the fuel core, are replaced at each refueling. Thus at any given time, the fuel core contains fuel bundles of various periods of fuel depletion. The degree of fuel depletion for each fuel bundle depends upon its residence time in the core. Thus, the required enrichment of the reload fuel depends not only on the anticipated position of the fuel bundle in the core, but also on the overall enrichment that must be added to the core to restore the desired amount of excess reactivity.

Ideally, the reload fuel would be designed on the basis of core operating data up to the time of the reactor refueling shutdown. As a practical matter this is not possible because of the lead time required for fuel bundle manufacture and because the refueling shutdown must be as short as possible. It is therefore highly desirable to reduce manufacturing lead time and to provide flexibility in the selection of fuel rod enrichment to provide a better match of the nuclear characteristics of the reload fuel with the requirements of the core.

In a known method of assembling fuel bundles, each rod is inserted by hand into a series of fuel rod spacers and a lower tie plate held on a support table. All the rods which are to go in a bundle are laid out side-by-side on a table in the order they are to be loaded. To assure against misplacement of fuel rods of high enrichment in the fuel bundle, means are provided to prevent the insertion of high enrichment fuel rods into low enrichment fuel rod positions of the fuel bundle. The shanks of the end plugs of high enrichment fuel rods are made of a larger diameter, as are the mating receptacle holes in the fuel bundle upper tie plate. This precludes insertion of high enrichment fuel rods into the smaller diameter receptacle holes of the low enrichment fuel rod positions.

A disadvantage of multiple diameter end plugs is that they require smaller coolant flow passages in the tie plates than would be necessary if all end plug shanks were of one, small diameter size.

The foregoing technique has been found to be an effective method of assuring accuracy in the assembly of fuel bundles. However, a significant amount of manual handling is involved with the possibility of worker radiation exposure, the possibility of damage to the rods and high labor costs. Additionally, when the group of rods which is inserted into a bundle is recorded, there is the possibility of transcription errors and the exact position of each rod may not be known.

The fixed drilling pattern of the receptacle holes in the fuel bundle tie plate has also been found to be a serious obstacle to the desired reduction in fuel bundle manufacturing lead time and to the desired flexibility to select particular fuel rod enrichments at the latest possible time, consistent with the availability of the assembled fuel bundles at the time of the reactor refueling shutdown. Additionally, specialization of parts increases production costs.

OBJECTS OF THE INVENTION

Accordingly, it is a primary object of the present invention to provide apparatus which is not subject to the foregoing problems and disadvantages.

It is an object of this invention to provide apparatus for the automatic identification of fuel rods, which guarantees reliability of proper positioning of each rod in a fuel bundle.

It is a further object of this invention to reduce manual handling damage of fuel rods by providing for automatic insertion of fuel rods into fuel bundles.

It is another object of this invention to reduce the preparation time and the cost of completed fuel bundles by eliminating the need for fixed drilling patterns of receptacle holes in fuel bundle upper tie plates and thus allow for the standardization of tie plates and end plugs.

It is an additional object of this invention to provide error free fuel rod insertion into tie plates that have small diameter end plug receptacles.

It is still a further object of this invention to improve reactor thermal performance by reducing the coolant pressure drop across fuel bundles by providing high flow coolant passages in fuel bundle tie plates.

It is an additional object of this invention to reduce labor costs by providing for automatic insertion of fuel rods into fuel bundles.

It is still another object of this invention to reduce data transcription errors through the use of automatic rod identification, location and data recording.

It is an additional object of this invention to reduce potential radiation exposure resulting from fuel rod handling.

SUMMARY OF THE INVENTION

The foregoing objects of the invention are achieved by the use of an automatic bundle assembly machine which takes a plurality of nuclear fuel rods containing various fuel enrichment and additive levels, identifies each rod and then inserts it in the appropriate fuel bundle coordinate position. A group of rods having the desired fuel enrichment and additive types is placed on a first queuing table. A lower tie plate and a series of fuel rod spacers are positioned on a support table to receive the fuel rods and hold them in a positioned array.

The automatic operation of the apparatus entails picking up the first rod on the queuing table by means of an escapement and raising it to a first position above the queuing table. An optical serial number reader then engages the lower end plug of the fuel rod to identify the rod. This information is transferred to a central controller.

Next, the rod is transferred to a loader by means of the escapement, where it rests on roller guides in an elongate trough. The loader is capable of moving in coordinate directions to position the identified rod opposite the appropriate coordinate position as determined by the central controller. Some of the roller guides are motorized and they push the rod longitudinally toward high speed pinch rollers at the end of the trough which slide the rod into the fuel rod spacers. A rod seating ram then engages the upper end plug of the rod and pushes the rod into a seated position in the lower tie plate, corresponding to the appropriate coordinate position. This sequence is then repeated for each rod on the queuing table until all the rods are positioned in the bundle. The loader then moves traversely to a second queuing table which has been set up in preparation for loading another bundle.

These and other objects of the present invention, together with the features and advantages thereof will become apparent from the following detailed specification, when considered in conjunction with the accompanying drawings in which applicable reference numerals are carried forward.

DETAILED DESCRIPTION OF THE INVENTION

Figure 1:
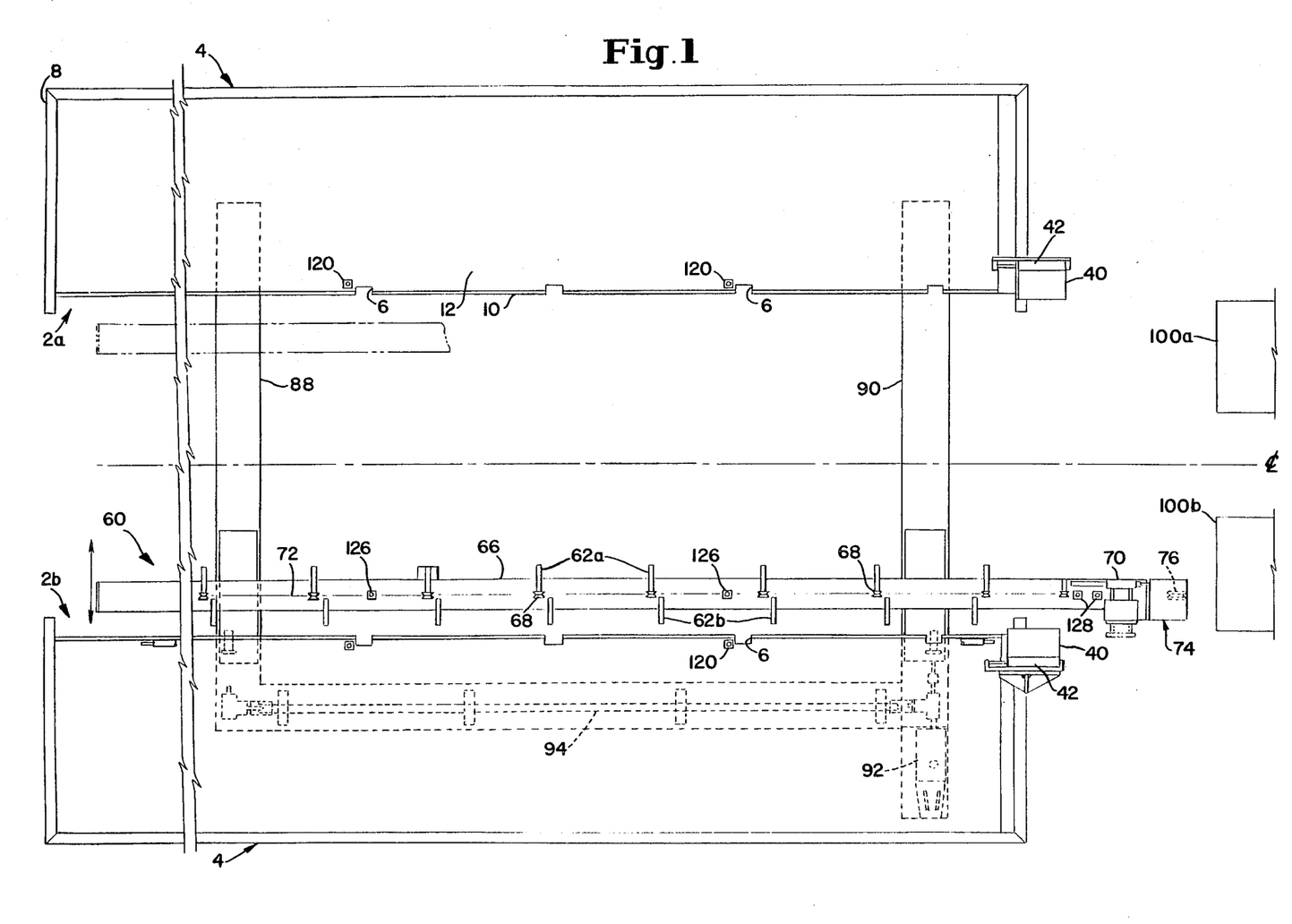
FIG. 1 shows a schematic plan view of the fuel bundle assembly machine in accordance with the present invention.
Figure 3:
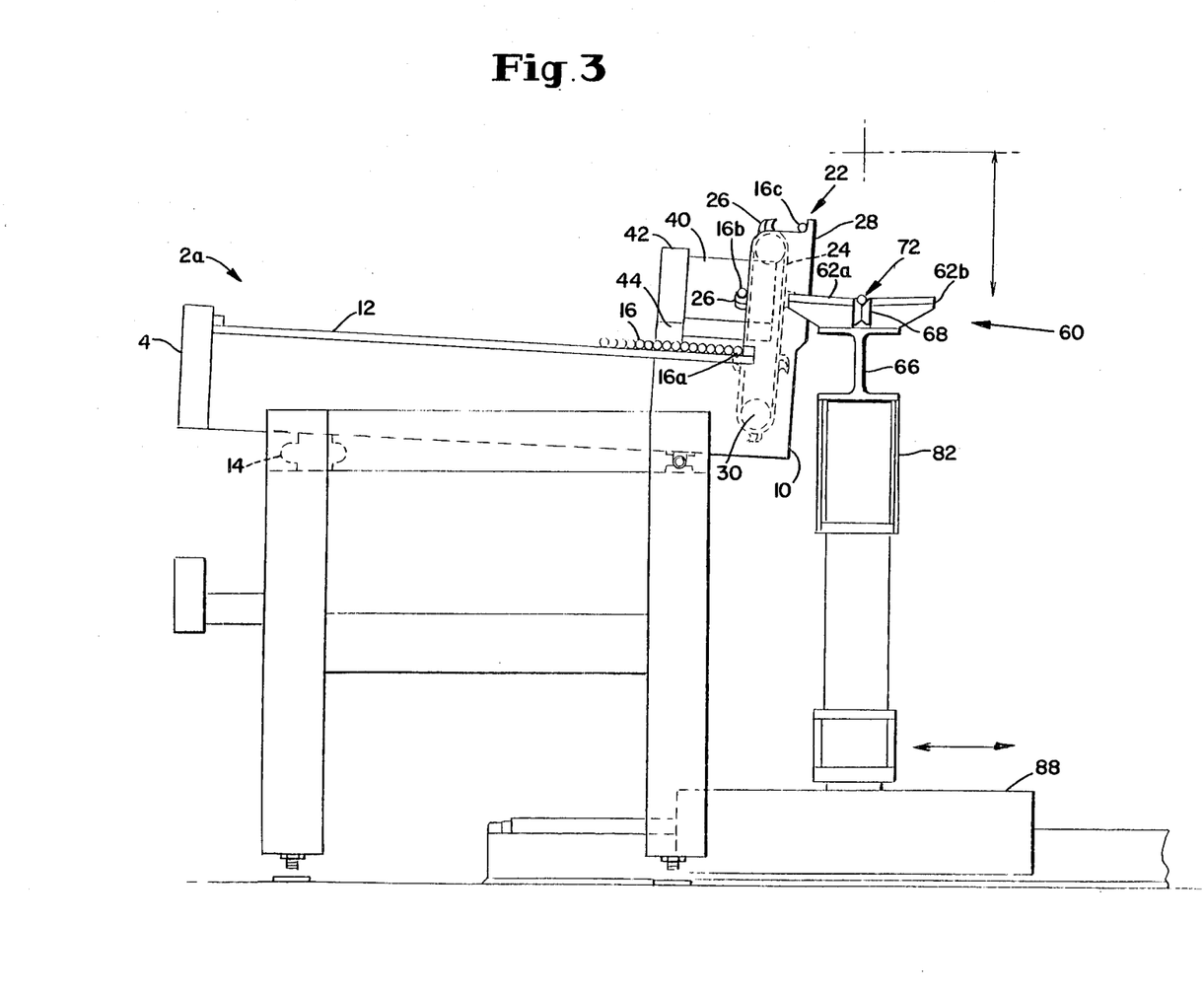
FIG. 3 is an end view of the loader together with one of the queuing stations.

Referring now to the drawings, FIG. 1 shows a plan view of a preferred embodiment of the fuel bundle assembly machine. Two queuing stations 2a and 2b are positioned on opposite sides of and parallel to a rod loader 60. The queuing stations each include an elongate queuing table 4. Each table 4 has a long table edge 10 which includes a plurality of longitudinally spaced notches 6. As seen in FIG. 3, a tilting mechanism 14 underneath table 4 is capable of raising the table edge opposite edge 10 so as to incline a surface 12 of the table toward edge 10. A plurality of nuclear fuel rods 16 are positioned on table surface 12 for inspection and are placed side by side near edge 10 by the tilting action.

Figure 4:
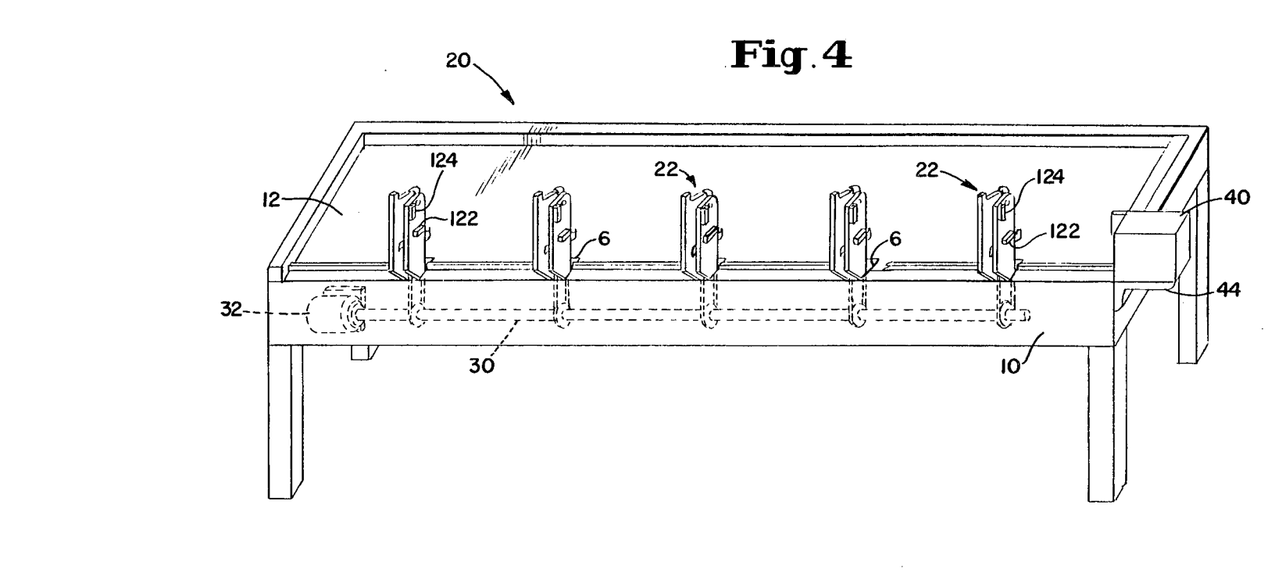
FIG. 4 is a perspective view of one of the queuing stations.

An escapement assembly 20 is positioned as seen in FIG. 4 along table edge 10 and includes a plurality of escapement members 22 each positioned in a notch 6, as best seen in FIG. 4. As shown in FIG. 3, each escapement member includes an endless chain 24 contained between guide plates 28. Each chain 24 moves in a plane perpendicular to table surface 12 and carries a plurality of mutually spaced pick-up hooks 26. As seen in FIG. 4, the escapement members are driven in synchronization by a common shaft 30, so that the hooks on respective chains 24 remain in longitudinal alignment with each other, i.e. the rotating chains jointly present successive series of aligned hooks. Shaft 30 is powered by a drive motor 32 or by other suitable driving means.

Each queuing station has a code reader 40 such as the one described and claimed in U.S. Pat. No. 4,499,595 positioned at one end of queuing table 4 above table surface 12. Code reader 40 is disposed on a track 42 in longitudinal alignment with a first rod position reached by each series of aligned hooks in its upward path to the top of the escapement. A motor 44 or other suitable means is adapted to move the code reader along the track.

A pair of elongate support tables 100a and 100b correspond to queuing stations 2a and 2b respectively. As shown in FIG. 1, the support tables are positioned parallel and alongside each other. As seen from FIG. 5, each table 100 supports a lower tie plate support fixture 104 and a series of fuel rod spacer support fixtures 108.

Figure 5:
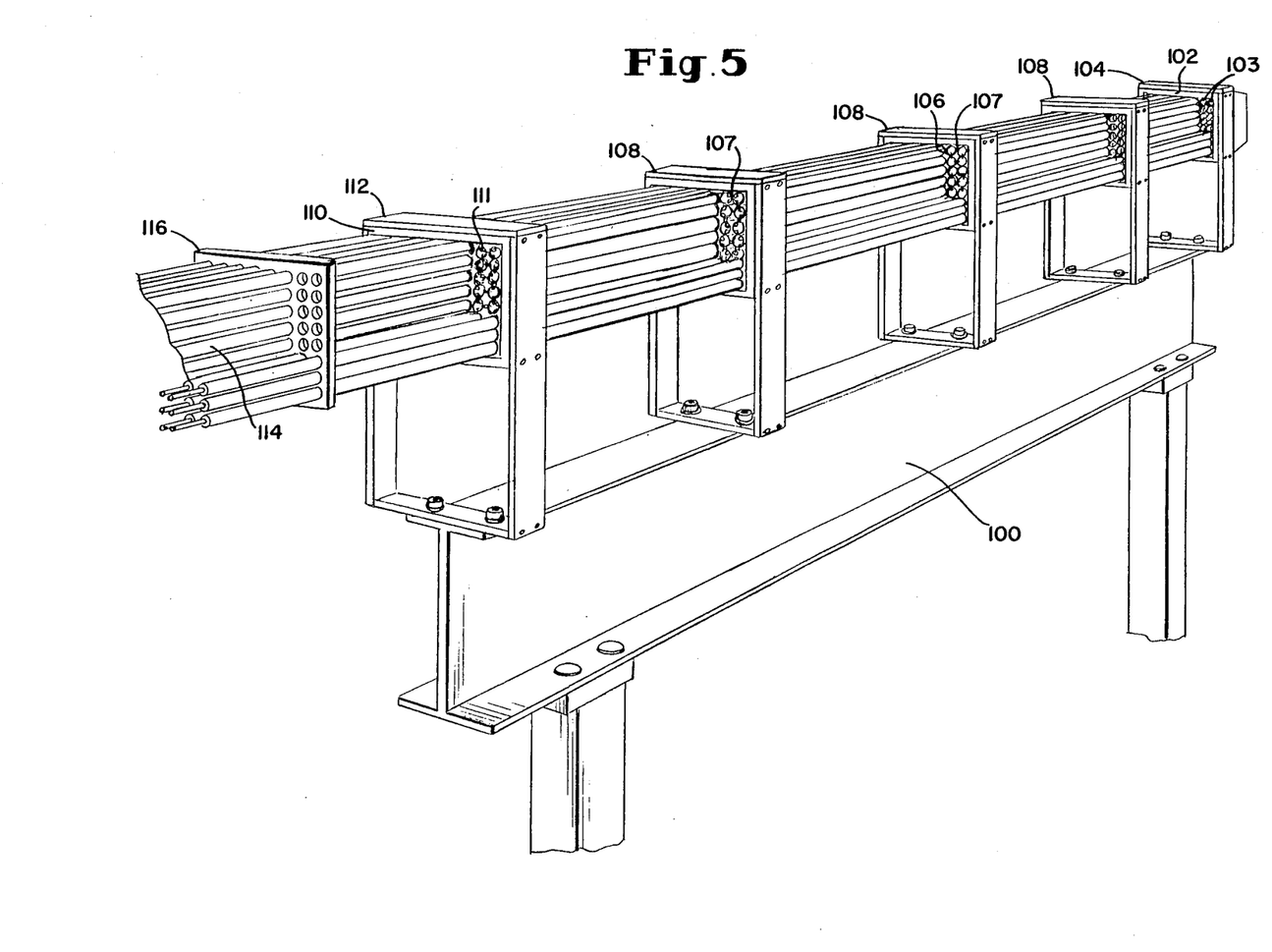
FIG. 5 is a perspective view of one of the support tables.

A lower tie plate 102, which includes an array of holes 103 for receiving the fuel rod lower end plugs, is supported in fixture 104 and a fuel rod spacer 106 having a corresponding array of holes 107 is supported in each fixture 108. A non-metallic buffer 110, preferably made of Nylon, having a corresponding array of holes 111 is mounted in a buffer support fixture 112, ahead of the series of fuel rod spacers 106. Tie plate 102, spacers 106 and buffer 110 are positioned so that corresponding holes in each are in coaxial alignment.

Figure 2:
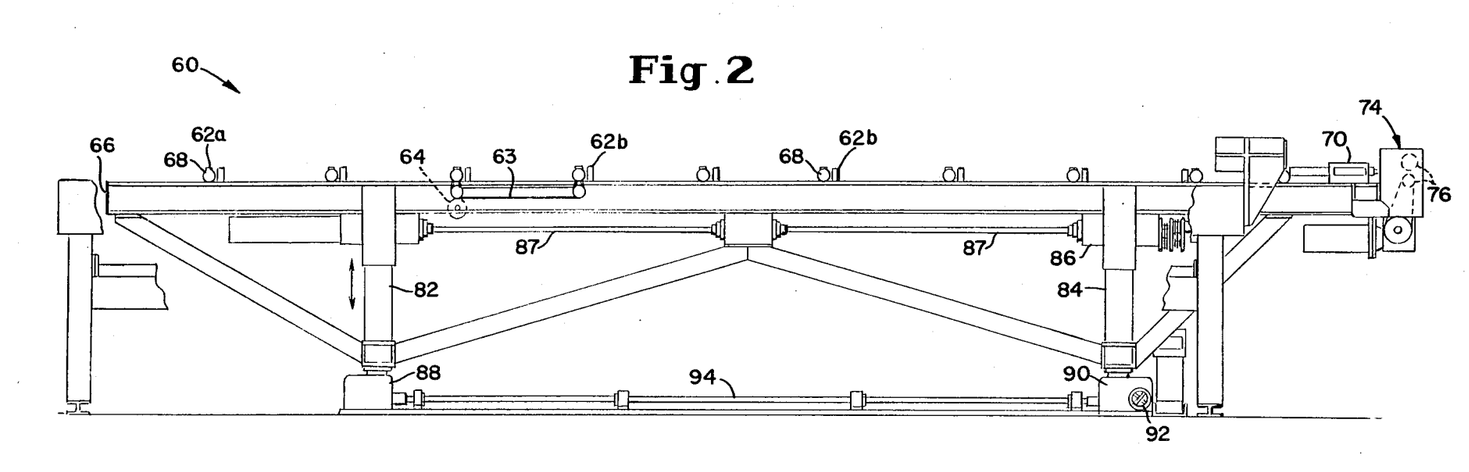
FIG. 2 is a side view of the loader shown in FIG. 1.

A rod loader 60, shown in FIGS. 1-3, is positioned between queuing stations 2a and 2b. The rod loader includes a beam 66 supported on a rear column 82 and on a front column 84. Two series of longitudinally spaced ramp members 62a and 62b are positioned on top of beam 66 and extend to either side of the beam. The ramp members incline toward an elongate central trough 72.

Loader 60 further includes transport means in the form of a plurality of roller guides 68 longitudinally spaced from each other and positioned in trough 72. The transport means further includes a high speed pinch roller assembly 74 having pinch rollers 76 positioned at one end of beam 66. Some of roller guides 68 are powered by a series of belts 63 connected to a motor 64 positioned on beam 66. The powered roller guides are capable of pushing a single fuel rod 16 along trough 72 toward pinch roller assembly 74. A rod seating ram 70 is positioned on beam 66 alongside the path of rod 16 and adjacent pinch roller assembly 74. Ram 70 can be moved sideways to be positioned in longitudinal alignment with a rod which has been pushed into the bundle by pinch rollers 76.

Loader 60 is capable of being moved in coordinate directions transverse to beam 66 so as to move the fuel rod currently on the loader to the desired two-dimensional coordinate position. Front column 84 and rear column 82 are driven in unison by drive motor 86 and shaft 87 to raise and lower beam 66 for vertical positioning of the fuel rod. A pair of parallel floor track assemblies 88 and 90 support columns 82 and 84, respectively and are aligned normal to beam 66. A drive motor 92 and shaft 94 cooperate with floor track assemblies 88 and 90 to move columns 82 and 84, and thus beam 66, in a horizontal direction along the path of the floor track assemblies between queuing stations 2a and 2b.

Operation of the fuel bundle assembly machine begins with the selection of a group of fuel rods having the required fuel enrichment and additive levels for the desired bundle geometry from an inventory of fuel rods. The rods are placed for inspection in a side-by-side queue on queuing table 4.

In preparation for receiving the fuel rods, lower tie plate 102, fuel rod spacers 106 and buffer 110 are all placed in the support fixtures on the support table which corresponds to the queuing station currently in use as shown in FIG. 5. In a preferred embodiment, two central water rods 114 which assist in cooling the fuel assembly are inserted into the rod spacers and tie plate. A second non-metallic buffer 116, also preferably made of Nylon, is mounted on the water rods between buffer 110 and the loader to intercept improperly aligned fuel rods before they reach the fuel rod spacers in order to prevent damage to the rods. Queuing table 4 is then tilted to an inclined position toward escapement 20 using tilting mechanism 14. At this point, the bundle loading machine is ready for computer controlled automatic operation.

The presence of the first rod in the queue is detected by a set of optical sensors 120 connected to a rod position control system which senses the presence of a rod at various critical points along its path. For purposes of illustration, the first critical position occupied by rod 16 is designated by the reference number 16a in FIG. 3. Thus when rod 16 is detected at 16a, escapement assembly 20 is activated. The next arriving series of aligned pick-up hooks 26 then lifts the rod to the above-described first rod position, designated 16b in FIG. 3, and in alignment with code reader 40.

Another set of optical sensors 122, shown in FIG. 4, detects the presence of the fuel rod in the first rod position and activates motor 44 through the aforesaid control system to move code reader 40 longitudinally along track 42. An optical sensor, not shown, senses when code reader 40 has reached the reading position relative to the coded lower end plug on the rod. In the reading position, the code reader surrounds the coded portion of the end plug and the code, in the form of a serial number on the end plug which identifies the particular fuel rod, is read. This is preferably implemented by the partial rotation of a code reading sensor around the end plug. The data read out is transferred to the control system and the code reader is retracted along track 42 to its initial position. Rod 16, which has now been read, is next moved by escapement members 22 to the top position reached by the escapement, i.e. position 16c, where it rests on guide plates 28, as shown in FIG. 3. Concurrently the next rod in the queue, the presence of which at position 16a has been detected, is raised to position 16b, as determined by the control system.

When a third set of optical sensors 124 shown in FIG. 4 detects the presence of the first rod in position 16c, the control system activates drive motor 92 for horizontal movement of loader 60 so as to position ramp members 62a under this rod. Drive motor 86 is then activated to cause columns 82 and 84 to elevate the loader so that the ramp members will lift the rod from guide plates 28 and thus out of position 16c. It will be clear from a consideration of FIG. 1, that ramp members 62 engage the rod intermediate guide plates 28, which are themselves positioned in slots 6. The rod so picked up from guide plates 28 rolls down ramp members 62 into trough 72 and onto roller guides 68.

A further set of optical sensors 126 detects the presence of the rod in trough 72. When a rod is present in the trough, the control system activates drive motors 86 and 92 to move loader 60 into general alignment with one of support tables 100 and to specifically place the rod currently in the trough into its predetermined two-dimensional coordinate position. The coordinate position is determined by the control system according to the previously read serial number on the fuel rod. The serial number, which is indicative of the fuel enrichment and additive levels in the fuel rod, then determines the rod's position in accordance with the desired bundle geometry. As previously explained, at least some of roller guides 68 are powered by drive motor 64 and belts 63. Once loader 60 has placed the rod currently in trough 72 in the proper coordinate position, the powered roller guides drive the rod toward pinch roller assembly 74 upon command by the control system. Pinch rollers 76 slide the rod off the loader and through buffer 116, then through buffer 110 and into spacers 106. Once the fuel rod leaves pinch roller assembly 74, its momentum carries it onward until friction in the spacer holes stops its motion. At this point the fuel rod is positioned in what is referred to herein as its designated coordinate position in the spacers. The latter position is in alignment with the predetermined coordinate rod position in the fuel bundle, but the rod is not yet fully seated in lower tie plate 102.

Next, rod seating ram 70 moves sideways into alignment with the partially seated fuel rod and longitudinally to engage the upper end plug of the fuel rod. A further set of optical sensors 128 shown in FIG. 1 detects the position of the ram at this point to determine whether or not the upper end plug is properly engaged. If so, the control system causes the ram to push the rod into its fully seated position in the lower tie plate, i.e. into its predetermined coordinate position in the coordinate array which constitutes the fuel bundle. At this point, the position of the rod in the bundle is recorded by the control system.

The foregoing loading sequence is repeated for each rod on the queuing table, until all the rods are properly placed in their predetermined coordinate position in the fuel bundle. During this loading sequence, which is fully automatic, the fuel rods for a further fuel bundle may be placed on the idle queuing table and the support table corresponding to the latter queuing station may be prepared.

While the present invention has been shown and described with reference to a preferred embodiment, it will be understood that numerous modifications, changes, variations, substitutions and equivalents will now occur to those skilled in the art without departing from the spirit and scope of the invention. Accordingly, it is intended that the invention herein be limited only by the scope of the appended claims.

What is claimed is:

1. Apparatus for placing a plurality of elongate objects of substantially identical size and shape in a coordinate array in a support structure wherein said objects are parallel and mutually spaced from each other and each object occupies a designated coordinate position as determined by an identifying code carried by each object;

said apparatus comprising:
a queuing station for holding said plurality of objects;
means for selectively removing said objects from said queuing station one at a time;
means for reading said code on said removed objects;
means responsive to each code read for positioning the corresponding object in horizontal and vertical alignment with said coordinate position;
transport means for longitudinally moving each of said aligned objects into said two-dimensional coordinate position; and
control means responsive to the presence of each object in a plurality of critical positions during its transfer between said queuing station and said coordinate position for timing and confirming the proper operation of said apparatus.

2. Apparatus for placing a plurality of elongate objects of substantially identical size and shape in a coordinate array wherein said objects are parallel and mutually spaced from each other and each object occupies a predetermined two-dimensional coordinate position as determined by an identifying code carried by said objects;

said apparatus comprising:
a queuing station for holding said plurality of objects;
an escapement associated with said queuing station and adapted to selectively remove said objects therefrom one at a time;
a code reader for reading said code on said removed objects;
means for supporting said plurality of objects in designated coordinate positions in coaxial alignment with their respective predetermined coordinate positions in said coordinate array;
a loader including means for receiving said removed objects from said escapement, said loader further including means responsive to the code read from each object for moving said object in coordinate directions to bring it into coaxial alignment with its designated coordinate position in said support means;
transport means on said loader for moving each of said aligned objects to said designated coordinate position on said support means; and
control means responsive to the presence of each object in a plurality of critical positions during its transfer between said queuing station and said coordinate array for timing the operation of said apparatus.

3. Apparatus according to claim 2 wherein said coordinate array of objects comprises a bundle of elongate nuclear fuel rods, at least some of said rods having different fuel enrichment and additive levels, and said code carried by each of said rods being indicative of said enrichment and additive level of the fuel in said rod.

4. Apparatus according to claim 3 wherein said means for moving said object in coordinate directions comprises means for moving said loader in said coordinate directions while said object is positioned thereon.

5. Apparatus according to claim 4 wherein said queuing station, said loader and said support means each has a length at least equal to that of said fuel rods, said queuing station being positioned to one side of said loader and parallel thereto, said support means being positioned behind said loader;

said apparatus further including:
a second queuing station positioned on the opposite side of said loader and parallel to said first-recited queuing station;
a second escapement and a second code reader associated with said second queuing station; and
second support means positioned alongside said first support means and parallel thereto;
whereby said positioning means is adapted to longitudinally align said loader with one or the other of said support means.

6. Apparatus according to claim 3 wherein said queuing station comprises an elongate table on which said rods are positioned side by side, said queuing station further including:
means for selectively tilting the surface of said table by raising one of the long table edges relative to the opposite table edge;
a plurality of mutually spaced notches in said opposite table edge transverse to the latter;
said escapement comprising a plurality of escapement members each including an endless chain positioned in one of said notches and movable in a plane perpendicular to said table surface;
a plurality of mutually spaced pick-up hooks attached to each chain, said hooks being spaced substantially identically on the respective chains so as to be in longitudinal alignment with corresponding hooks on other escapement members; and
means for selectively driving said chains in synchronization;
whereby said hooks are adapted to lift said rods one at a time from said table surface to a first rod position longitudinally aligned with said code reader.

7. Apparatus according to claim 6 wherein each of said fuel rods terminates in a lower end plug which carries the code applicable to said rod;
said code reader being positioned at one end of said table above said table surface; and
said apparatus further including means for moving said code reader in a longitudinal direction into reading position relative to said lower end plug of the fuel rod currently held in said first rod position.

8. Apparatus according to claim 3 wherein each of said fuel rods terminates in a lower end plug which carries the code applicable to said rod, said support means including:

an elongate support table;

a series of fuel rod spacers mounted on said support table longitudinally spaced from each other, each of said spacers including a plurality of holes mutually spaced in a plane transverse to the longitudinal direction, corresponding holes in respective spacers being coaxially aligned with said predetermined coordinate positions of said bundled rods;

a lower tie plate mounted on said support table longitudinally behind said series of spacers, said tie plate including a plurality of holes coaxially aligned with said spacer holes and adapted to receive said lower end plugs of said rods; and buffer means mounted on said support table longitudinally ahead of said series of spacers, said buffer means being relatively soft and including a plurality of holes coaxially aligned with said spacer holes, said buffer means being adapted to prevent damage to improperly aligned rods before they enter said spacers.

9. Apparatus according to claim 3 wherein said receiving means includes an elongate trough adapted to receive respective rods broadside one at a time;

said transport means including a plurality of high speed pinch rollers positioned at the end of said trough nearest said support means and adapted to drive the fuel rod present in said trough longitudinally into said designated coordinate position in said support means;

said transport means further including a plurality of roller guides longitudinally spaced from each other in the low portion of said trough; and means for driving some of said roller guides to move each rod received in said trough longitudinally to said pinch rollers.

10. Apparatus according to claim 9 wherein said loader further includes a rod seating ram, said ram being adapted to push each rod held by said support means in a longitudinal direction into its predetermined coordinate position in said bundle of fuel rods.

11. Apparatus for placing a plurality of elongate nuclear fuel rods of substantially identical size and shape into a pair of nuclear fuel bundles wherein each of said rods occupies a predetermined two-dimensional coordinate position, at least some of said rods having different fuel enrichment and additive levels, each of said rods including a lower end plug having a code impressed thereon indicative of said enrichment and additive level; said apparatus comprising:

first and second queuing stations comprising a pair of parallel elongate tables on each of which said rods are adapted to be positioned side by side, means for selectively tilting the surface of each of said tables by raising one of the long table edges relative to the opposite long table edge, respective opposite table edges of said first and second queuing stations being mutually spaced and facing each other, and a plurality of mutually spaced notches in each of said opposite table edges transverse to said edges;

an escapement associated with each of said queuing stations adapted to selectively remove said fuel rods from said table surface, said escapement comprising a plurality of escapement members each including an endless chain positioned in one of said notches and movable in a plane perpendicular to said table surface and a plurality of mutually spaced pick-up hooks attached to each chain, said hooks being spaced substantially identically on the respective chains so as to be in longitudinal alignment with other corresponding hooks on respective escapement members, and means for selectively driving said chains in synchronization to lift said rods one at a time from said table surface to a first rod position;

a code reader associated with each of said queuing stations for reading said code, said code reader being positioned at one end of said elongate table above said table surface and in alignment with said first rod position;

means for moving said code reader in a longitudinal direction toward the fuel rod currently held in said first rod position to engage the lower end plug thereof in a reading position;

first and second mutually spaced, elongate support tables corresponding to said first and second queuing stations respectively, said support tables being positioned parallel and alongside each other, each of said support tables including a series of fuel rod spacers mounted thereon longitudinally spaced from each other, each of said spacers including a plurality of holes mutually spaced in a plane transverse to the longitudinal direction, corresponding holes in the respective spacers mounted on each of said support tables being coaxially aligned with said predetermined coordinate rod positions of the corresponding fuel bundle, each support table further including a lower tie plate mounted thereon longitudinally behind said series of spacers, said tie plate including a plurality of holes coaxially aligned with said spacers holes and adapted to receive said lower end plugs of said rods, and buffer means mounted on said support table longitudinally ahead of said series of spacers, said buffer means being relatively soft and including a plurality of holes coaxially aligned with said spacer holes, said buffer means being adapted to prevent damage to improperly aligned rods before they enter said spacers;

a loader positioned between said queuing stations, said loader including means for receiving said removed rods broadside from one or the other of said escapements, said receiving means including an elongate trough;

means responsive to the code read from the end plug of the rod currently on said loader for positioning said loader in coordinate directions to bring said rod thereon into longitudinal alignment with its predetermined coordinate position in the corresponding fuel bundle;

said loader further including transport means including a plurality of high speed pinch rollers positioned at the end of said trough nearest said support means and adapted to drive each fuel rod present in said trough longitudinally into said rod spacers in alignment with its predetermined coordinate position, said transport means further including a plurality of roller guides longitudinally spaced from each other in the low portion of said trough, and means for driving at least some of said roller guides to move each rod received in said trough longitudinally to said pinch rollers; and control means responsive to the presence of each rod in a plurality of critical positions during its transfer between each of said queuing stations and the corresponding fuel bundle for timing the operation of said apparatus;

whereby said loader is adapted to operate with one or the other of said support tables.

12. Apparatus according to claim 11 wherein said loader further includes a rod seating ram, said ram being adapted to push each rod held by said support means in a longitudinal direction into its predetermined coordinate position in the corresponding fuel bundle.

* * * * *